(12) United States Patent
Jung et al.

(10) Patent No.: US 7,962,015 B2
(45) Date of Patent: *Jun. 14, 2011

(54) APPARATUS FOR REPRODUCING AV DATA IN INTERACTIVE MODE, METHOD OF HANDLING USER INPUT, AND INFORMATION STORAGE MEDIUM THEREFOR

(75) Inventors: Kil-soo Jung, Gyeonggi-do (KR);
Hyun-kwon Chung, Seoul (KR);
Sung-wook Park, Seoul (KR);
Seong-jin Moon, Gyeonggi-do (KR);
Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 977 days.

This patent is subject to a terminal disclaimer.

(21) Appl. No.: 10/647,445

(22) Filed: Aug. 26, 2003

(65) Prior Publication Data
US 2004/0131334 A1 Jul. 8, 2004

(30) Foreign Application Priority Data

Aug. 26, 2002 (KR) .............................. 2002-0050524
Nov. 25, 2002 (KR) ......................... 10-2002-0073476
Aug. 21, 2003 (KR) ......................... 10-2003-0057991

(51) Int. Cl.
*H04N 5/917* (2006.01)
(52) U.S. Cl. ....................................................... 386/355
(58) Field of Classification Search .................. 386/1, 4, 386/45, 95, 125–126
See application file for complete search history.

(56) References Cited

U.S. PATENT DOCUMENTS

| 7,178,106 B2 * | 2/2007 | Lamkin et al. ................ 715/716 |
| 2001/0042043 A1 | 11/2001 | Shear et al. |
| 2002/0010584 A1 | 1/2002 | Schultz et al. |
| 2003/0044171 A1 * | 3/2003 | Otsuka et al. ................. 386/126 |
| 2004/0114914 A1 | 6/2004 | Jung et al. |
| 2004/0114915 A1 | 6/2004 | Jung et al. |

FOREIGN PATENT DOCUMENTS

| JP | 11-298881 | 10/1999 |
| JP | 11-306317 | 11/1999 |
| JP | 2000-149048 | 5/2000 |
| JP | 2000-330794 | 11/2000 |
| JP | 2000-353353 | 12/2000 |

(Continued)

OTHER PUBLICATIONS

U.S. Appl. No. 10/647,440, filed Aug. 26, 2003, Kil-so Jung et al., Samsung Electronics Co., Ltd.

(Continued)

*Primary Examiner* — Peter-Anthony Pappas
*Assistant Examiner* — Tat Chio
(74) *Attorney, Agent, or Firm* — NSIP Law

(57) ABSTRACT

An apparatus reproduces AV data in an interactive mode, a method handles a user input, and an information storage medium stores information therefor. The information storage medium includes AV data and a markup document utilized to reproduce the AV data in an interactive mode. The markup document includes first event information of an occurrence of a key input event corresponding to a user action to inform, by default, an AV playback engine, which plays back the AV data. Accordingly, interactive contents may be controlled using a limited user input device.

19 Claims, 10 Drawing Sheets

FOREIGN PATENT DOCUMENTS

| | | |
|---|---|---|
| JP | 2001-285815 | 10/2001 |
| JP | 2001-346148 | 12/2001 |
| KR | 1020030067459 | 8/2003 |
| KR | 1020040003154 | 1/2004 |
| KR | 10-2004-0018934 | 3/2004 |

OTHER PUBLICATIONS

U.S. Appl. No. 10/647,443, filed Aug. 26, 2003, Kil-so Jung et al., Samsung Electronics Co., Ltd.

PCT International Search Report; Dated Dec. 23, 2003.

Office Action issued on Feb. 5, 2008 by the Japanese Patent Office for Japanese Patent Application No. 2005-501238.

Office Action issued in corresponding Japanese Patent Application No. 2005-501238 dated Oct. 14, 2008.

Malaysian Notice of Allowance issued on Nov. 13, 2009, in corresponding Malaysian Patent Application No. PI 20033214 (3 pages).

W3C: "XHTML Events Module" Dec. 21, 1999, pp. 1-29, URL: http://www.w3.org/TR/1999/WD-xhtml-events-19991221/xhtml-events.pdf.

DVD Forum: "DVD Book Construction Jun. 2001" Jan. 27, 2002, pp. 1-3, URL: http://web.archive.org/web/20020127100026/http://www.dvdforum.org/tech-dvdbook.htm.

DVD Forum: "DVD Book Construction Mar. 2002" Oct. 17, 2002, pp. 1-3, URL: http://web.archive.org/web/20021017195325/http://www.dvdforum.org/tech-dvdbook.htm.

DVD FLLC: "DVD Book Construction Sep. 2003" Sep. 1, 2003, pp. 1-2, URL: http://www.dvdfllc.co.jp/bookcon.htm.

DVD FLLC: "How to order DVD Book (DVD Specification)" Oct. 14, 2003, p. 1, URL: http://www.dvdfllc.co.jp/howto/howto.htm.

Supplementary European Search Report issued on Jul. 20, 2010, in corresponding European Application No. 03792876.9 (4 pages).

* cited by examiner

FIG. 6A

| KeyCode | KeyName | ENAV ENGINE | AV PLAYBACK ENGINE |
|---|---|---|---|
| 0 | 0 | DEFAULT OPERATIONS ARE NOT DEFINED NOTE 1) | |
| 1 | 1 | DEFAULT OPERATIONS ARE NOT DEFINED | WHEN AV DATA STREAM INCLUDES PCI DATA AND BUTTON IS DISPLAYED BY THE PCI DATA, PERFORM Button_Select_and_Activate (Button Number) FUNCTION CORRESPONDING TO NUMBER |
| 2 | 2 | DEFAULT OPERATIONS ARE NOT DEFINED | |
| 3 | 3 | DEFAULT OPERATIONS ARE NOT DEFINED | |
| 4 | 4 | DEFAULT OPERATIONS ARE NOT DEFINED | |
| 5 | 5 | DEFAULT OPERATIONS ARE NOT DEFINED | |
| 6 | 6 | DEFAULT OPERATIONS ARE NOT DEFINED | |
| 7 | 7 | DEFAULT OPERATIONS ARE NOT DEFINED | |
| 8 | 8 | DEFAULT OPERATIONS ARE NOT DEFINED | |
| 9 | 9 | DEFAULT OPERATIONS ARE NOT DEFINED | |
| 10 | A | DEFAULT OPERATIONS ARE NOT DEFINED | DEFAULT OPERATIONS ARE NOT DEFINED |
| 11 | B | DEFAULT OPERATIONS ARE NOT DEFINED | DEFAULT OPERATIONS ARE NOT DEFINED |
| 12 | PlayPause | DEFAULT OPERATIONS ARE NOT DEFINED | NOTE 4) |
| 13 | Stop | DEFAULT OPERATIONS ARE NOT DEFINED | PERFORM Stop() FUNCTION |
| 14 | FastForward | DEFAULT OPERATIONS ARE NOT DEFINED | PERFORM Forward_Scan(Speed) FUNCTION |
| 15 | FastRewind | DEFAULT OPERATIONS ARE NOT DEFINED | PERFORM Backward_Scan(Speed) FUNCTION |
| 16 | Prev | DEFAULT OPERATIONS ARE NOT DEFINED | PTT_Search(Current PTT Number−1) NOTE 5) |

FIG. 6B

| KeyCode | KeyName | ENAV ENGINE | AV PLAYBACK ENGINE |
|---|---|---|---|
| 17 | Next | DEFAULT OPERATIONS ARE NOT DEFINED | PTT_Search(current PTT number+1) NOTE6) |
| 18 | Subtitle | DEFAULT OPERATIONS ARE NOT DEFINED | PERFORM Sub_picture_stream_Change(Sub-picture stream number, Display flag) FUNCTION NOTE 7) |
| 19 | Angle | DEFAULT OPERATIONS ARE NOT DEFINED | PERFORM Angle_Change(Angle number) FUNCTION NOTE 8) |
| 20 | Audio | DEFAULT OPERATIONS ARE NOT DEFINED | PERFORM Audio_stream_Change(Audio stream number) FUNCTION NOTE 9) |
| 21 | RootMenu | DEFAULT OPERATIONS ARE NOT DEFINED | PERFORM Menu_Call(Root) FUNCTION |
| 22 | TitleMenu | DEFAULT OPERATIONS ARE NOT DEFINED | PERFORM Menu_Call(Title) FUNCTION |
| 23 | Up | PERFORM NAVIGATION OPERATION FOR SELECTING ELEMENTS OF MARKUP DOCUMENT ONTO WHICH FOCUS IS BROUGHT | PERFORM Upper_Button_Select() FUNCTION |
| 24 | Left | | PERFORM Left_Button_Select() FUNCTION |
| 25 | Right | | PERFORM Right_Button_Select() FUNCTION |
| 26 | Down | | PERFORM Lower_Button_Select() FUNCTION |
| 27 | OK | PERFORM OPERATION FOR EXECUTING SELECTED ELEMENT | PERFORM Button_Activate() FUNCTION |
| 28 | Return | DEFAULT OPERATIONS ARE NOT DEFINED | PERFORM Resume(ParentMenu) FUNCTION |
| 29 | Exit | DEFAULT OPERATIONS ARE NOT DEFINED | PERFORM Resume() FUNCTION |
| 30 | Content | DEFAULT OPERATIONS ARE NOT DEFINED | DEFAULT OPERATIONS ARE NOT DEFINED |
| 31 | Screen | NOTE 2) | DEFAULT OPERATIONS ARE NOT DEFINED |
| 32 | Focus | NOTE 3) | DEFAULT OPERATIONS ARE NOT DEFINED |

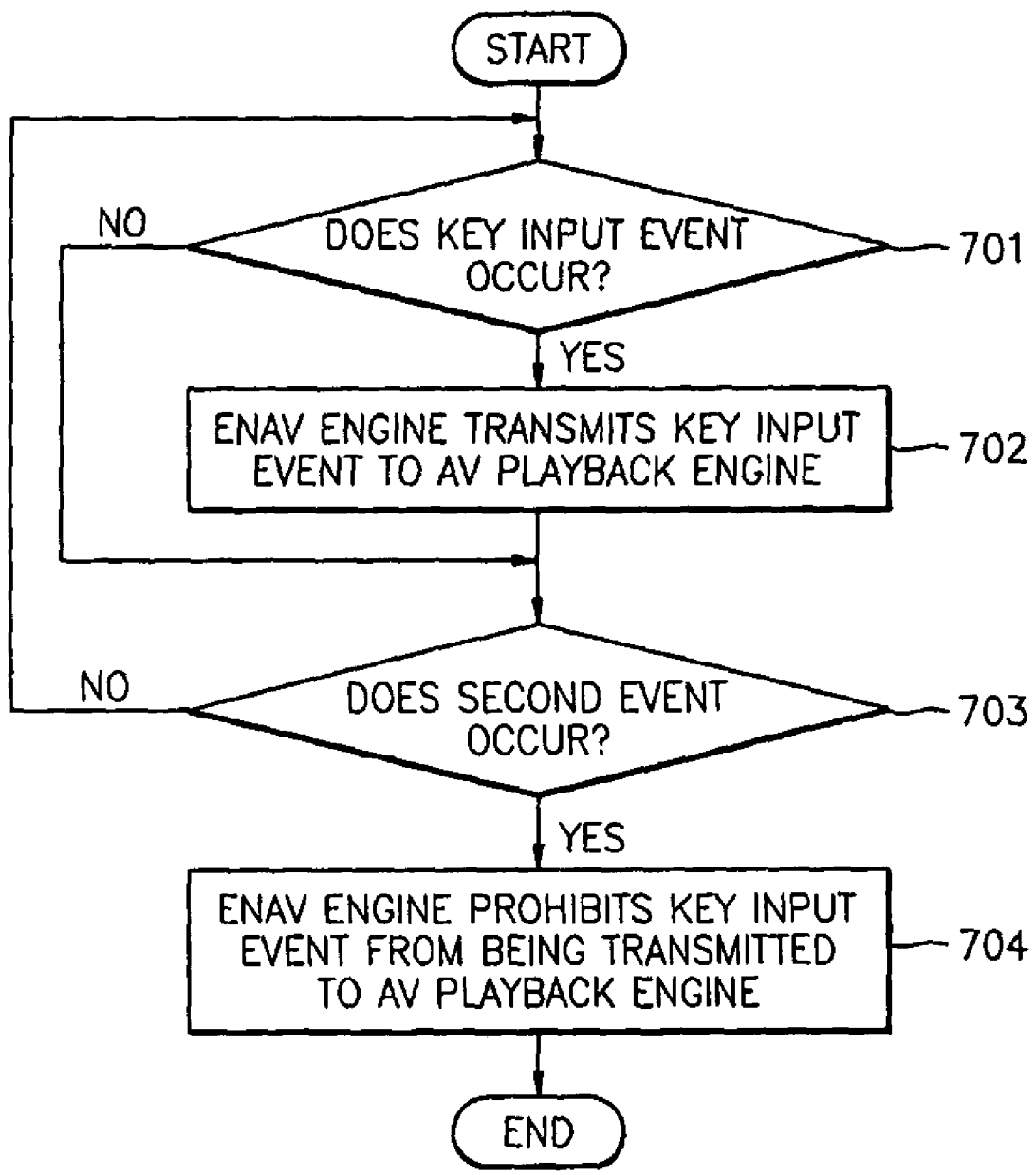

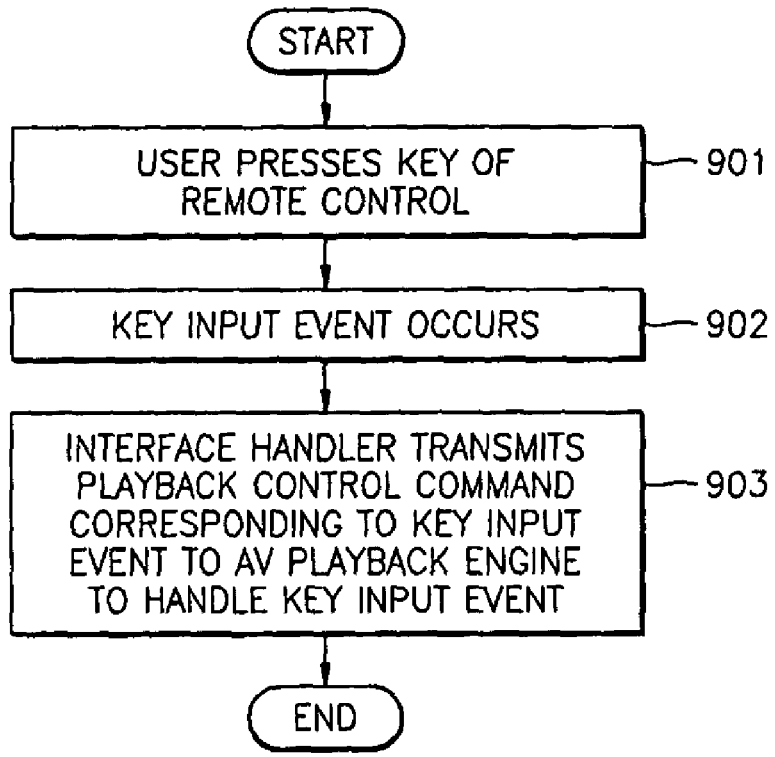
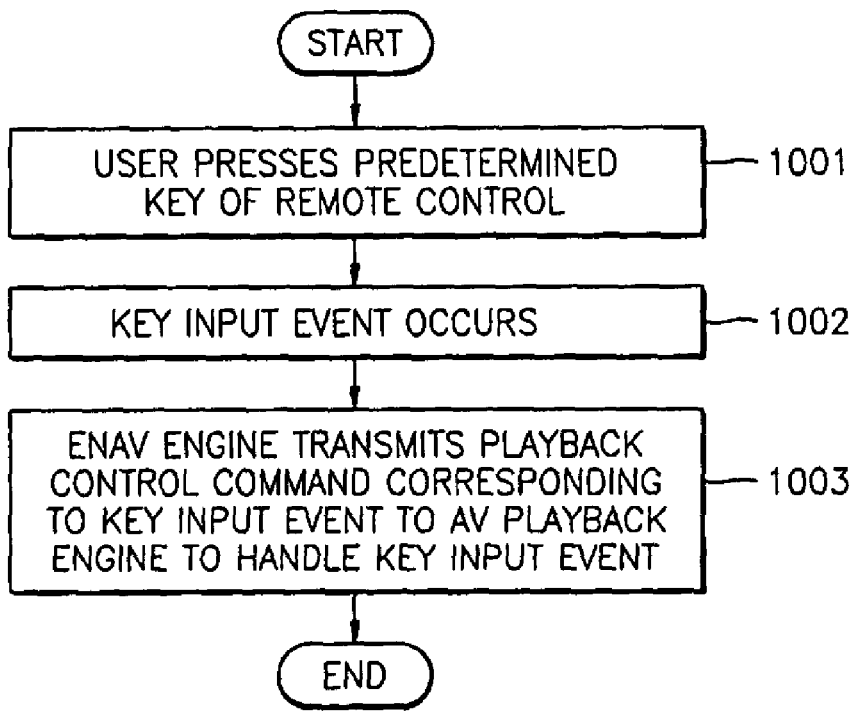

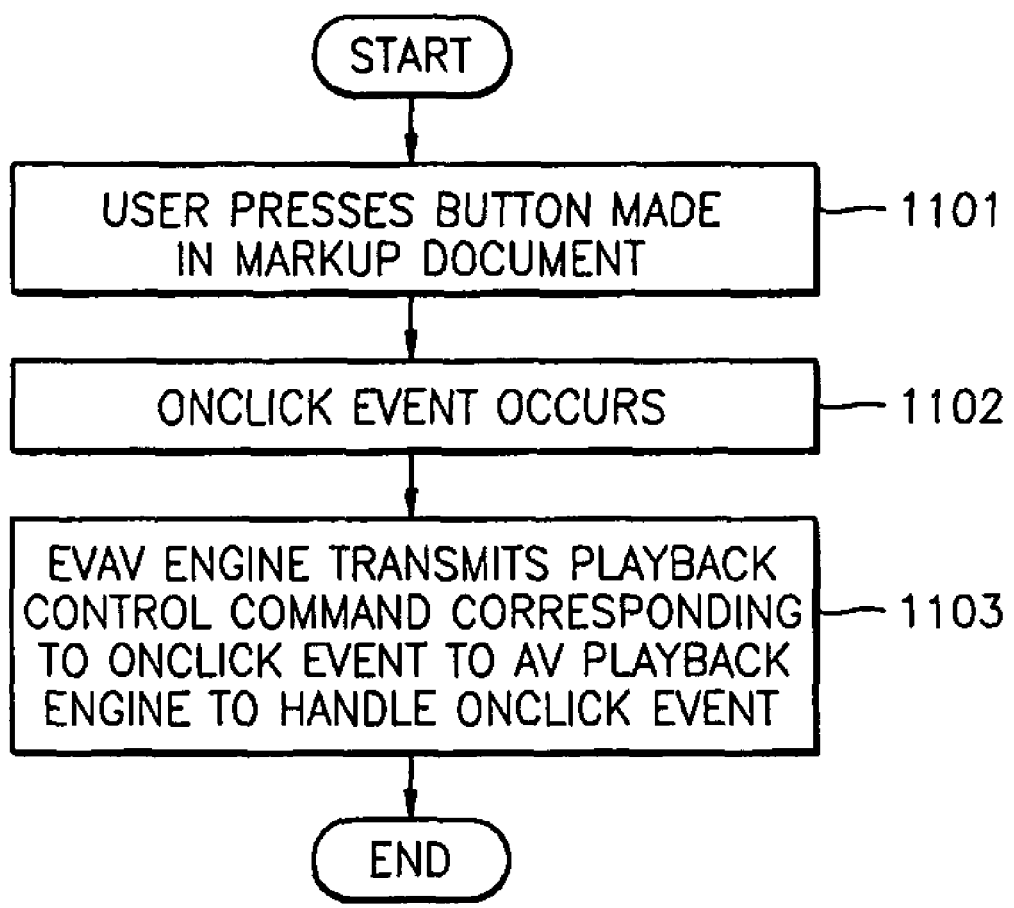

APPARATUS FOR REPRODUCING AV DATA IN INTERACTIVE MODE, METHOD OF HANDLING USER INPUT, AND INFORMATION STORAGE MEDIUM THEREFOR

CROSS-REFERENCE TO RELATED APPLICATIONS

This application claims the priority of Korean Patent Application Nos. 2002-50524, 2002-73476, and 2003-57991, filed on Aug. 26 and Nov. 25, 2002 and Aug. 21, 2003, in the Korean Intellectual Property Office, the disclosures of which are incorporated herein in their entireties by reference.

BACKGROUND OF THE INVENTION

1. Field of the Invention

The present invention relates to an apparatus for reproducing AV data in an interactive mode, a method of handling a user input, and an information storage medium therefor.

2. Description of the Related Art

Digital versatile discs (DVDs), which are capable of playing back AV data in an interactive mode based on a personal computer (PC), are being sold in the marketplace. On interactive DVDs, AV data is recorded according to DVD-Video standards in addition to markup documents for supporting an interactive function. AV data recorded on an interactive DVD may be displayed in two modes: a video mode wherein AV data is displayed in the same way as general DVD-Video data and an interactive mode wherein an AV picture from AV data is embedded in a display window defined in a markup document to be displayed along with a markup document. For example, in a case wherein AV data is a movie title, the movie title is shown in a display window of a screen and various additional pieces of information such as scripts, plots, photos of actors and actresses, and the like are displayed on the remaining portion of the screen. Alternatively, the various additional information may be displayed in synchronization with the title (AV data). For example, when a specific actor or actress appears in the title, a markup document containing information on his or her background may be displayed.

The interactive mode requires two playback engines, i.e., a playback engine for interpreting and presenting a markup document and an AV playback engine for playing back AV data of a DVD-Video format. In other words, two large domains, which may be navigated by a user, i.e., a markup document and DVD-Video data, exist in the interactive mode. Since the two domains are controlled and navigated by different methods, it is preferable that a control key and a navigation key exist separately. In a case of a conventional interactive DVD, a browser built in a PC serves as a playback engine for playing back a markup document and user input devices of the PC, i.e., a keyboard with relatively many input keys and a mouse capable of pointing anywhere in the markup document, serve as navigation keys.

However, in an event that a home device, which is controlled by a user input device such as a remote control with limited keys and supports the interactive mode, is desired to be realized, the use of individual navigation keys is not efficient.

SUMMARY OF THE INVENTION

The present invention provides an apparatus which reproduces AV data in an interactive mode by effectively handling a user input using a user input device with a limited number of keys, a method which handles the user input, and an information storage medium which stores information therefor.

A reproducing apparatus manages a user input in a predetermined manner so that an interactive content maker makes interactive contents with which a user may further effectively interact. In addition, a method handles the user input, and an information storage medium stores information therefor.

According to an aspect of the present invention, an information storage medium includes AV data and a markup document necessary to reproduce the AV data in an interactive mode. The markup document includes first event information to inform by default an AV playback engine, which plays back the AV data, of an occurrence of a key input event corresponding to a user action.

The first event information may include event registration information to check whether the user performed the action and event handling information to handle the event by controlling an operation of the AV playback engine when the key input event occurs.

The event registration information may be recorded using an on-click event defined in the markup document, and the event handling information may be created by a function to allow the AV playback engine to perform an operation corresponding to the on-click event, or the event registration information may be recorded using a key input event listener to check whether the key input event occurs, and the event handling information may be recorded using a key input event handler to control the operation of the AV playback engine.

The AV playback engine may be informed of the occurrence of the key input event via an ENAV engine that interprets and executes the markup document.

The markup document may include second event information to prohibit the AV playback engine, which decodes the AV data, from being informed of the occurrence of the key input event.

According to another aspect of the present invention, a method handles a user input in an interactive mode in which played back AV data is displayed with a markup document. When a key input event corresponding to a user action occurs, an ENAV engine, which interprets and executes the markup document, is informed of the occurrence of the key input event. By default, the ENAV engine informs an AV playback engine of the occurrence of the key input event, and the AV playback engine plays back the AV data.

According to still another aspect of the present invention, a method handles a user input in an interactive mode in which played back AV data is displayed with a markup document. An AV playback engine, which decodes the AV data, is informed by default of an occurrence of a key input event corresponding to a user action. When a second event occurs using second event information recorded in the markup document, the AV playback engine is prohibited from being informed of the occurrence of the key input event.

According to yet another aspect of the present invention, an apparatus reproduces AV data in an interactive mode. The apparatus includes an AV playback engine that plays back the AV data and an ENAV engine that interprets and executes a markup document. When a key input event corresponding to a user action occurs, the ENAV engine informs, by default, the AV playback engine of the occurrence of the key input event.

When a second event occurs using second event information recorded in the markup document, the ENAV engine may not inform the AV playback engine of the occurrence of the key input event.

The ENAV engine may include an interface handler that informs the AV playback engine of the occurrence of the key input event.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A and 6B illustrate "predetermined information on the operations of the ENAV engine 3 and an AV playback engine 4" in accordance with an embodiment of the present invention;

FIG. 7 is a flowchart illustrating operations of a method of handling a user input in an interactive mode, according to an embodiment of the present invention;

FIG. 9 is a flowchart illustrating operations of a method of handling a user input in an interactive mode, according to still another embodiment of the present invention;

FIG. 10 is a flowchart illustrating operations of a method of handling a user input in an interactive mode, according to yet another embodiment of the present invention; and FIG. 11 is a flowchart illustrating operations of a method of handling a user input in an interactive mode, according to still yet another embodiment of the present invention.

DETAILED DESCRIPTION OF THE EMBODIMENTS

Figure 1:
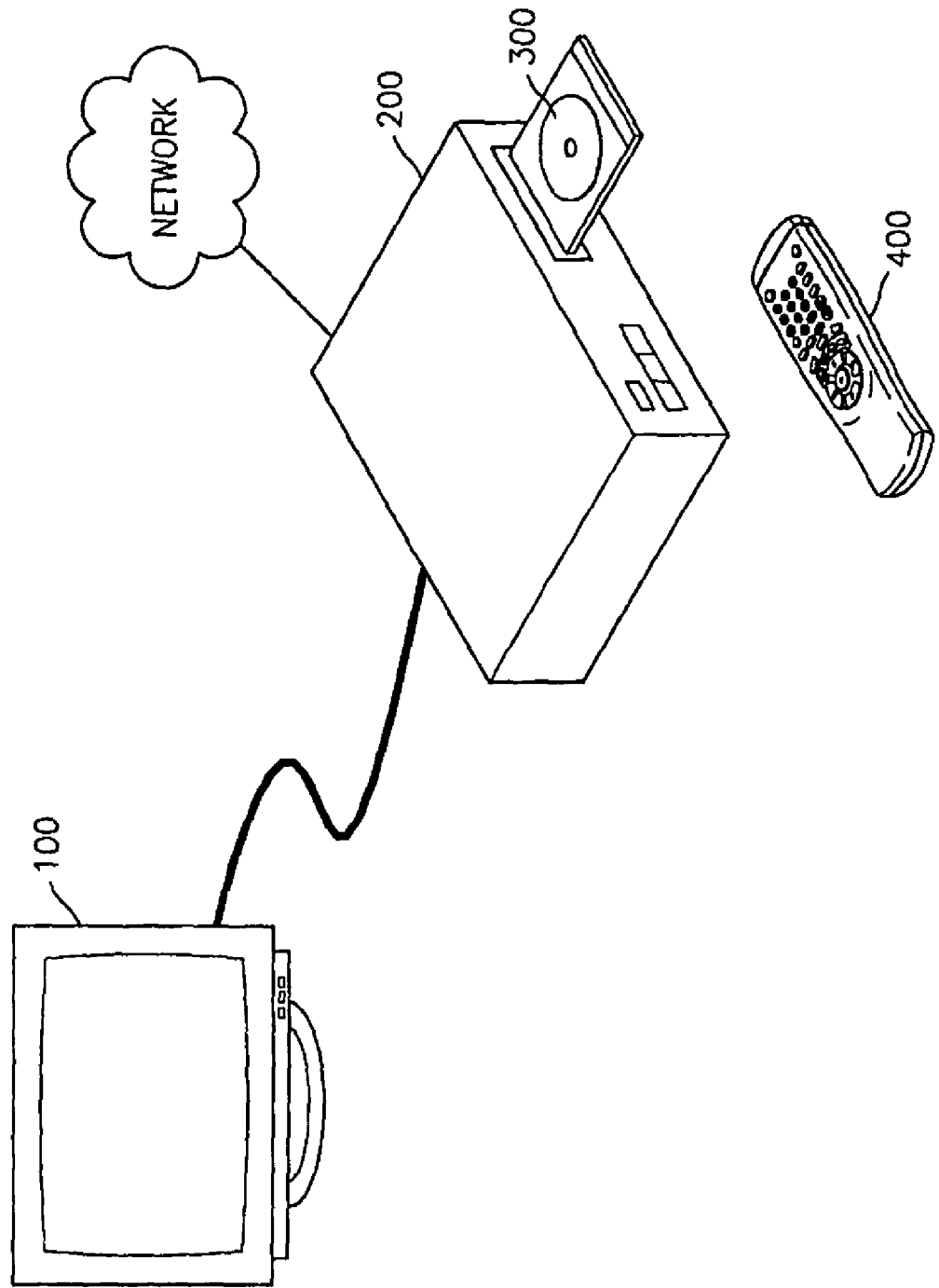
FIG. 1 is a conceptional view of a playback system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The term 'Interactive contents' refers to all contents which are displayed or are displayable to a user in an interactive mode. In other words, the term "interactive contents" refers to contents which may be shown by AV data, markup documents, and program codes and/or resource files inserted into or linked to the markup documents. For example, when DVD-Video data is played back in an interactive mode, interactive contents are largely classified into DVD-Video contents (AV contents) and markup documents. A 'markup document' is written in markup language such as XML, HTML, or the like. In other words, the 'markup document' indicates a markup resource including A.png, A.jpg, and A.mpeg linked to A.xml as well as A.xml. Thus, the markup document serves as an application necessary to play back AV data in an interactive mode and as interactive contents which are displayed with AV data to the user.

FIG. 1 is a conceptional view of a playback system according to an embodiment of the present invention. Referring to FIG. 1, the playback system includes a DVD 300 as an information storage medium, a playback device 200, a TV 100 as a display device, and a remote control 400 as a user input device. The remote control 400 receives a user's control command, and then transmits the user's control command to the playback device 200. The playback device 200 plays back AV data recorded on the DVD 300 in an interactive mode. When the DVD 300 is loaded into a DVD drive in the playback device 200 and a user chooses an interactive mode, the playback device 200 plays back the corresponding AV data in the interactive mode using a corresponding markup document, and then transmits the corresponding AV data to the TV 100. The TV 100 displays an AV picture formed by AV data that has been played back together with a markup picture formed by a markup document by embedding the AV picture in the markup picture. The interactive mode refers to a mode in which an AV picture is displayed in a display window defined in a markup document, i.e., an AV picture is embedded in a markup picture. Here, the AV picture is formed by playing back DVD-Video data recorded on the DVD 300, by the playback device 200, and then is displayed on the TV 100. The markup picture is formed by interpreting and implementing a markup document recorded on the DVD 300, by the playback device 200, and then is displayed on the TV 100. The markup picture in which the AV picture is embedded, i.e., a picture displayed in the interactive mode, is called an interactive picture. A "video mode" refers to a mode in which AV data is played back as defined in conventional DVD-Video standards, i.e., only an AV picture formed by playing back corresponding AV data is displayed. In the embodiment of FIG. 1, the playback device 200 supports the interactive mode, the video mode, and a full-screen mode that is a sub-display mode of the interactive mode. The full-screen mode is a display mode defined in Korean Patent Application No. 02-7031, entitled "Information Storage Medium on which Mode Display Information is Recorded, and Playing Back Apparatus and Method therefor", filed on Feb. 7, 2002 by the applicant of the present invention. The full-screen mode refers to a mode in which an AV picture is magnified and appears on the entire screen in an interactive mode. Furthermore, in the embodiment of FIG. 1, the playback device 200 may fetch a markup document from a network.

Figure 2:
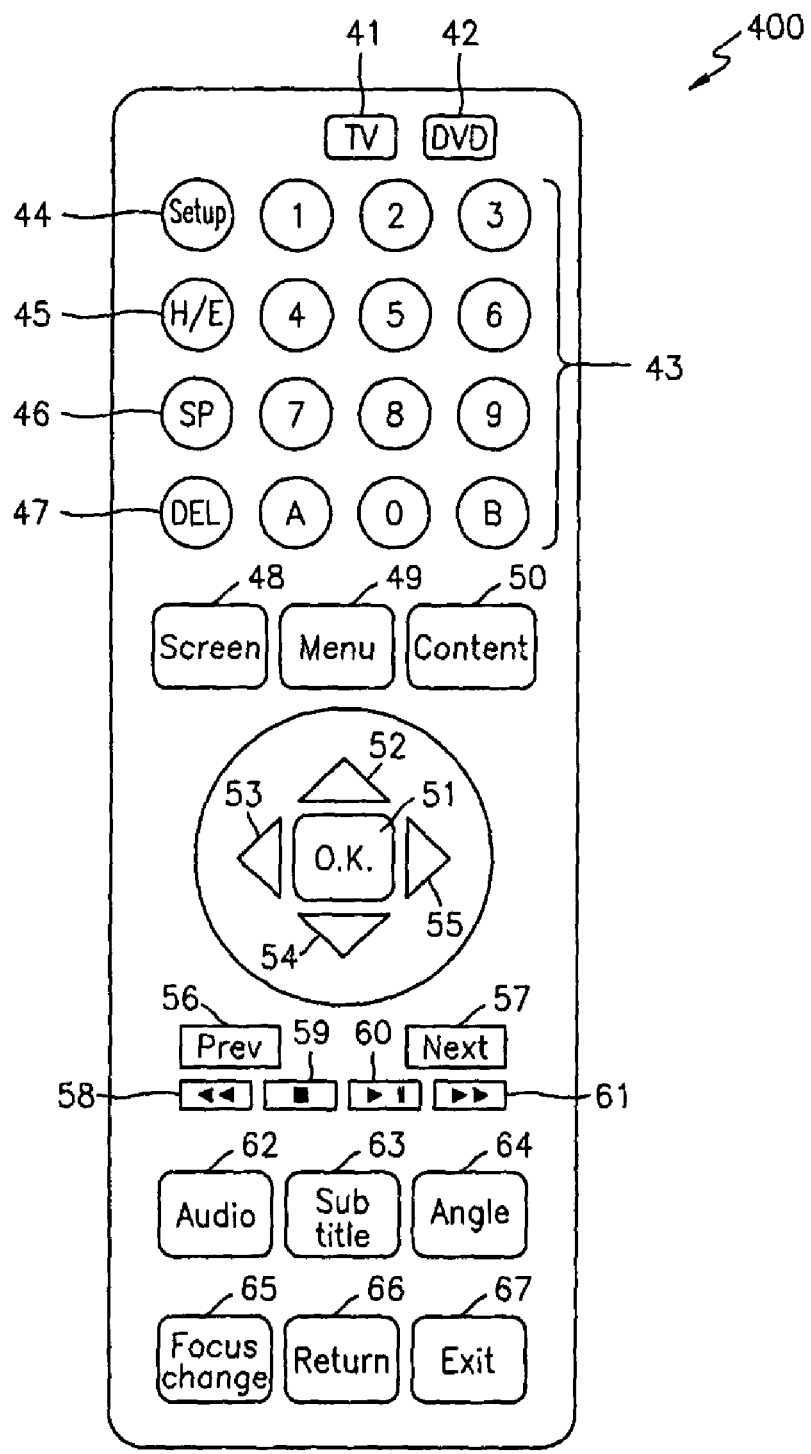
FIG. 2 is a top view of a remote control 400 of FIG. 1.

FIG. 2 illustrates a top view of the remote control 400 of FIG. 1. Referring to FIG. 2, the remote control 400 includes various functional keys. A 'TV' button 41 is utilized to view a broadcast signal received from an external source via the TV 100. A 'DVD' button 42 is utilized to view a video title, according to the embodiment of FIG. 2, wherein the video title is AV data transmitted from the playback device 200 via the TV 100. Numeral/special character keys 43, used to choose channels, are arranged on an upper portion of the remote control 400. A 'Setup' button 44 is a key utilized to call an on-screen display (OSD) menu to set up the playback device 200, an 'H/E' button 45 is a language conversion key, an 'SP' button 46 is a space key, and a 'DEL' button 47 is a delete key. A 'Screen' button 48 is a key that is used to convert a display mode of an AV picture into an interactive mode, i.e., from an embedded mode to a full-screen mode, a 'Menu' button 49 is a key that is used to call a menu screen, and a 'Content' button 50 is a key that is used to download predetermined information from the Internet. Reference numerals 52, 53, 54, and 55 denote an up key, a left key, a down key, and a right key, respectively, which are direction keys to move focus or highlighted information in the interactive picture. An 'OK' button 51 is a key to select elements of a markup document containing focus or highlighted information or a menu.

Reference numerals 56, 57, 58, 59, 60, and 61 denote a preview key, a next key, a fastrewind key, a stop key, a play/pause key, and a fastforward key, respectively, which are keys to play back the video title. When a video title is played back, a user may convert the language of the audio portion using an 'Audio' button 62, language of the subtitles using a 'Subtitle' button 63, and the angle of a picture using an 'Angle' button 64.

A 'Focus change' button 65 is used to change to and from different domains in the interactive picture, i.e., to move a focus from an AV picture to a markup picture or from a markup picture to the AV picture. When a user presses the 'Focus change' button 65, a user input corresponding to the button pressed is processed according to an embodiment of the present invention. The detailed descriptions of this process will be explained later.

A 'Return' button 66 is used to move among hierarchies in a menu having a hierarchical structure. An 'Exit' button 67 is used to move from a menu screen to a playback screen of the video title. The remote control 400 shown in FIG. 2 has been used as an example to specifically manage the DVD 300 on which the video title is recorded. Therefore, detailed functional keys of the remote control 400 and the number of the functional keys may vary. Also, some of the functional keys may be put into the OSD menu. Alternatively, some items of the OSD menu may be realized as the functional keys.

Figure 3:
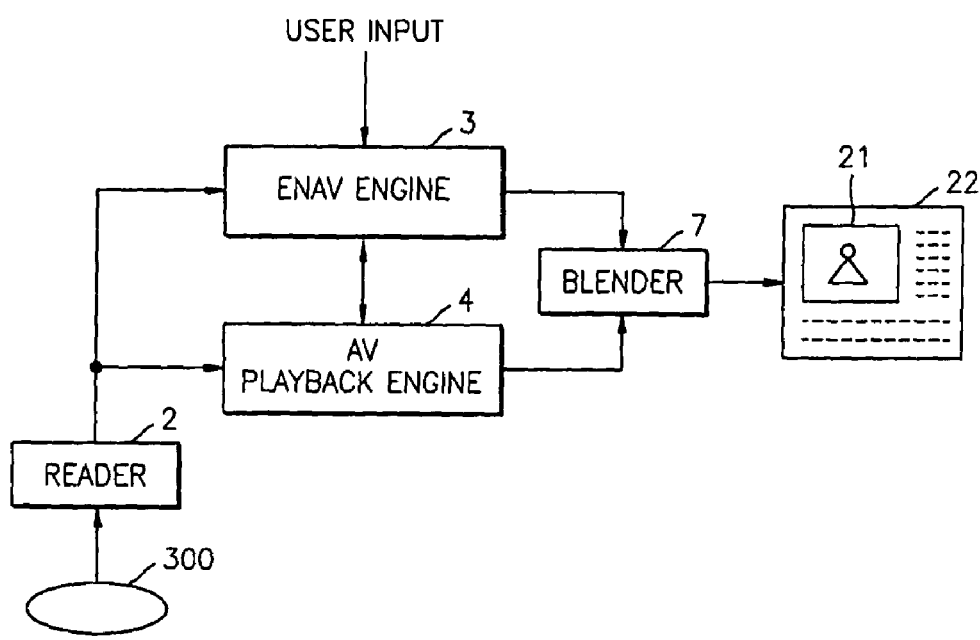
FIG. 3 is a block diagram of a playback device 200 of FIG. 1.

FIG. 3 is a block diagram of the playback device 200 of FIG. 1. Referring to FIG. 3, the playback device 200 includes a reader 2, an ENAV engine 3, an AV playback engine 4, and a blender 7.

The reader 2 reads AV data, i.e., DVD-Video data and a markup document according to the present embodiment, from the DVD 300 in response to a control signal output from the ENAV engine 3. The markup document contains at least one of first event information, second event information, and third event information as event information according to an embodiment of the present invention. The first event information is used to control an AV picture in an interactive mode, i.e., the AV playback engine 4's operation of playing back the DVD-Video data. The second event information is used to prohibit a user input from being transmitted to the AV playback engine 4. The third event information is used to control the operation of the ENAV engine 3 when the user input is forwarded to or prohibited from being forwarded to the AV playback engine 4.

A first event occurs when the first event information is used, a second event occurs when the second event information is used, and a third event occurs when the third event information is used.

The AV playback engine 4 plays back the read AV data. In an embodiment, since AV data is recorded as DVD-Video data, the AV playback engine 4 is embodied as a DVD-Video data playback engine to play back DVD-Video data. The AV playback engine 4 communicates with the ENAV engine 3 via an application program interface (API). In other words, the AV playback engine 4 informs the ENAV engine 3 of a property of the operational status thereof in response to a request made by the ENAV engine 3 and transmits a trigger to the ENAV engine 5. For example, when the movie 'StarWars' is shown in an interactive mode, the trigger informs the ENAV engine 3, before or after a point of time at which a war scene is to be displayed, that a quiz corresponding to the war scene is to be displayed in a markup picture when the war scene is displayed in an AV picture.

Moreover, when a key input event occurs via a predetermined key of the remote control 400 pressed by the user, the AV playback engine 4 receives the key input event via the ENAV engine 3. In other words, when the user presses the predetermined key of the remote control 400, the key input event occurs and the AV playback engine 4 is informed of the occurrence of the key input event so that the AV playback engine 4 controls the DVD-Video data using the key input event. When the first event occurs, the AV playback engine 4 performs an operation defined by the first event. However, as previously described, when the second event occurs, the AV playback engine 4 cannot be informed of the occurrence of the key input event from the user.

The ENAV engine 3 is an interpretation engine which verifies, interprets, and executes markup documents written in markup language, script language and/or other program languages. In an embodiment, the ENAV engine 3 verifies, interprets, and lays out a markup document in order to play back DVD-Video data which is recorded on the DVD 300 in the interactive mode, in the interactive mode. In particular, when the first event information is recorded in the markup document and the first event occurs using the first event information, the ENAV engine 3 informs the AV playback engine 4 of the occurrence of the first event. When the key input event corresponding to the user action occurs, the ENAV engine 3 may inform, by default, the AV playback engine 4 of the occurrence of the key input event. In a case wherein the second event information is recorded in the markup document and the second event occurs using the second event information, the ENAV engine 3 may prohibit the AV playback engine 4 from being informed of the occurrence of the key input event corresponding to the user action. Furthermore, in a case wherein the third event information is recorded in the markup document and the third event occurs using the third event information when the user input is forwarded directly to or prohibited from being forwarded to the AV playback engine 4, the ENAV engine 3 performs an operation corresponding to the third event.

The ENAV engine 3 may include various plug-ins. The plug-ins enable files of various formats contained in or linked to the markup document to be opened. For example, the ENAV engine 3 may call a WINDOWS MEDIA PLAYER to play back the AV data for the windows media player. Also, the ENAV engine 3 may be connected to a network to fetch necessary information such as markup documents or the like.

The blender 7 blends and outputs a DVD-Video stream that has been played back with an interpreted markup document. Next, an interactive picture including a markup picture 22 and an AV picture 21 is displayed on the TV 100.

Figure 4:
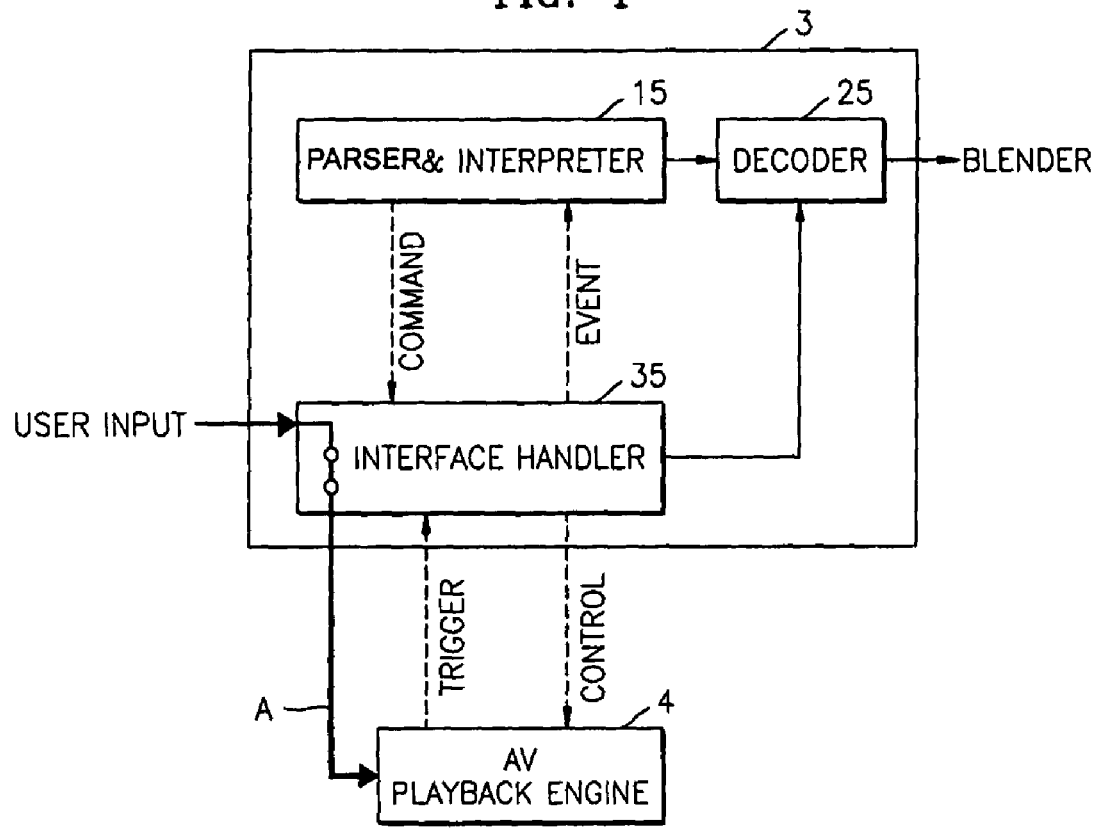
FIG. 4 is a partial block diagram to illustrate, in more detail, an embodiment of the operation of an enhanced audio video (ENAV) engine 3 of FIG. 3.

FIG. 4 is a partial block diagram to illustrate, in more detail, the operation of the ENAV engine 3 of FIG. 3. Referring to FIG. 4, the ENAV engine 3 includes a parser & interpreter 15, a decoder 25, and an interface handier 35. When the key input event corresponding to the user action occurs, the interface handier 35 is informed of the occurrence of the key input event corresponding to the user action and informs, by default, the AV playback engine 4 of the occurrence of the key input event.

The parser & interpreter 15 parses a markup document and interprets the markup document and script codes recorded in the markup document. The script codes are used to control, dynamically, objects contained in the markup document in an interactive mode. An event serves as a trigger to activate an event handler (function) to control the objects. In other words, in an embodiment, the parser & interpreter 15 interprets event information recorded in the markup document in markup language and/or script language and transmits a corresponding command to the interface handler 35 to handle the event according to the interpreted event information.

The interface handler 35 converts a trigger transmitted from the AV playback engine 4 into an event that may be interpreted by the parser & interpreter 15, a status from the AV playback engine 4 into a property that may be understood by the parser & interpreter 15, and a command from the parser & interpreter 15 into a control command that may be handled by the interface handler 35 or understood by the AV playback engine 4.

In an embodiment, when the first event occurs using the first event information to control the AV picture in the interactive mode, the interface handler 35 informs the AV playback engine 4 of the occurrence of the first event. Also, when the key input event corresponding to the user action occurs, the interface handler 35 transmits the control command to the AV playback engine 4 through a path A using an API command InputRCKey that has a KeyCode assigned to a key of the remote control 400 as a parameter. In addition, when the second event occurs using the second event information, the interface handler 35 does not inform the AV playback engine 4 of the occurrence of the key input event, even though the key input event corresponding to the user action occurs. Furthermore, when a user input to control the markup document in the interactive mode, i.e., the third event, occurs using the third event information, the interface handler 35 transmits the user input to the parser & interpreter 15 so that the parser & interpreter 15 may perform an operation corresponding to the user input.

The decoder 25 decodes and renders interactive contents according to the command transmitted from the parser & interpreter 15. The term "renders" refers to controlling the layout of pages of a markup document and the output of AV data.

Hereinafter, events according to an embodiment of the present invention will be described in detail. The first event information includes event registration information to check whether the user performs an action corresponding to the first event and event handling information to handle the first event by controlling the operation of the AV playback engine 4. Here, the first event information is recorded in the markup document so that the first event occurs, the event registration information is used to register the first event, and the event handling information is used to handle the first event.

Example 1 of Realization of First Event

The registration of the first event is realized by a key input event listener to check whether the key input event occurs, and the handling of the first event is realized by a key input event handler to control the operation of the AV playback engine 4.

Example 2 of Realization of First Event

The registration of the first event is realized by an on-click event defined in markup language, and the handling of the first event is realized by a function to allow the AV playback engine 4 to perform an operation corresponding to the on-click event. Here, the key input event handler or the function serves to transmit a control command corresponding to a key or button pressed by a user to the AV playback engine 4.

Source codes of a markup document according to Example 1 of Realization of First Event are represented as follows:

```
<?xml version ="1.0" encoding="UTF-8"?>
<!DOCTYPE html PUBLIC "-//DVD//DTD XHTML DVD-
HTML 1.0//EN"
"http://www.dvdforum.org/envideo/dtd/dvdhtml-1-0.dtd">
<html>
<head>
<title>Example 1</title>
<script type= "text/javascript">
  function RcKeyEventHandler(evt)
  {
  if(evt.keyCode == 12)
     dvdVideo.InputRCKey(12);
  }
</script>
<script type= "text/javascript">
function setupEventHandler( )
{
// eventHandler is registered to bodyNode and Interactive Contents
bodyNode.addEventListener("rckeypress",RcKeyEventHandler,true);
}
</script>
</head>
<body id="bodyNode" onload="setupEventHandler( )"
..................................................................
</body>
</html>
```

In the markup document according to Example 1 of Realization of First Event, the event registration information is written in JavaScript language as follows:

```
<script type= "text/javascript">
function setupEventHandler( )
{
// eventHandler is registered to bodyNode and Interactive Contents
bodyNode.addEventListener("rckeypress",RcKeyEventHandler,true);
}
</script>
```

As may be seen in the above event registration information, when an event 'rckeypress' occurs, i.e., a user presses a predetermined key of the remote control 400, a function 'RcKeyEventHandler' is called.

The event handling information is written in JavaScript language as follows:

```
<script type= "text/javascript">
  function RcKeyEventHandler(evt)
  {
  if(evt.keyCode == 12)
     dvdVideo.InputRCKey(12);
  }
</script>
```

As may be seen in the above event handling information, a function 'RcKeyEventHandler' executes dvdVideo.InputRCKey(12) when a key code is 12. In other words, when a code assigned to a key pressed by a user is 12, the ENAV engine 3 transmits a corresponding control command to the AV playback engine 4 using the command API dvdVideo.InputRCKey so that the AV playback engine 4 performs a playback control operation assigned to the key code 12.

In other words, by registering a key input event of the remote control 400 in the 'body' of a markup document, when the user presses a key of the remote control 400, the ENAV engine 3 is informed of the occurrence of the key input event and informs the AV playback engine 4 of the occurrence of the key input event. Playback of DVD-Video data may be controlled by a method in which a control command corresponding to the pressed key is transmitted to the AV playback engine 4 when a markup document maker chooses one of the keys of the remote control 400 and the user presses the chosen key.

Source codes of a markup document according to Example 2 of Realization of First Event are represented as follows:

```
<?xml version ="1.0" encoding="UTF-8"?>
<!DOCTYPE html PUBLIC "-//DVD//DTD XHTML DVD-
HTML 1.0//EN"
"http://www.dvdforum.org/envideo/dtd/dvdhtml-1-0.dtd">
<html>
<head>
<title>Example 2</title>
<script type="text/javascript">
<--
  function Btn_PlayPause( )
  {
        dvdVideo.InputRCKey(12);
  }
-->
</script>
</head>
<body>
 <table border="0" width="720" height="480">
<tr>
 <td width="277" height="184" align="left" valign="top">
<object data="dvd:" width="277" height="184" border="0"/>
</td>
<td width="443" height="480" align="left" valign="top" rowspan="2">
<img src="b1.png" width="443" height="400" border="0"/>
<button name="PlayPause" value="PLAY/PAUSE"
onclick="Btn_PlayPause( )">
</td>
</tr>
<tr>
<td width="277" height="296">
<img src="b2.png" width="277" height="296" border="0"/>
</td>
</tr>
</table>
</body>
</html>
```

In the markup document according to Example 2 of Realization of First Event, the event registration information is written in markup language as follows:

```
<button name="PlayPause " value="PLAY/PAUSE"
    onclick="Btn_PlayPause( )">
```

Figure 5:
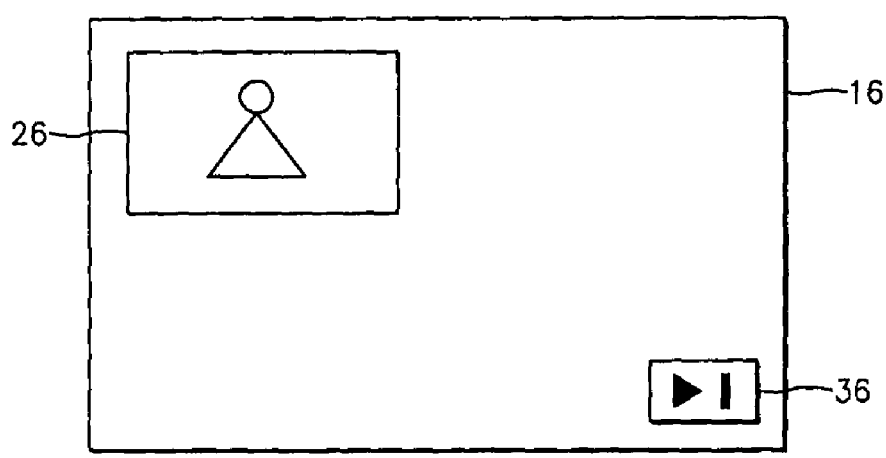
FIG. 5 illustrates an example of an interactive screen in accordance with an embodiment of the present invention.

In other words, as shown in FIG. 5, when an on-click event occurs in an interactive picture which is displayed with a markup picture 16 that includes an AV picture 26 and a 'Play/Pause' key 36, i.e., a user presses the Play/Pause key 36, a function 'Btn_PlayPause( )' is called.

The event handling information is written in JavaScript language as follows:

```
<script type="text/javascript">
<--
  function Btn_PlayPause( )
  {
        dvdVideo.InputRCKey(12);
  }
-->
</script>
```

As may be seen in the above event handling information, a function 'Btn_PlayPause' executes an API command dvdVideo.InputRCKey(12). In other words, when the user presses the 'Play/Pause' key 36 displayed in the interactive picture, the ENAV engine 3 transmits a corresponding control command to the AV playback engine 4 using the command API dvdVideo.InputRCKey so that the AV playback engine 4 performs a playback control operation assigned to the key code 12.

The playback of DVD-Video data may be controlled according to the intention of the interactive content maker using a method by which the API command dvdVideo.InputRCKey(keyCode) is connected to an onclick( ) event of a button in a markup document so that a control command corresponding to the button is transmitted to the AV playback engine 4 when the user clicks on the button.

As described above, when the AV playback engine 4 is informed of the occurrence of the key input event corresponding to the user action by recording the first event information in the markup document, the interactive content maker may transmit the user input to the AV playback engine 4.

Without using a method by which the first event information is recorded in the markup document to handle the key input event from the user, the ENAV engine 3 may transmit a control command corresponding to the key input event as the default to the AV playback engine 4 via the API command to handle the key input event.

The second event according to an embodiment of the present invention is realized by an API command EnableRCKInput( ). The API command EnableRCKInput( ) is used as an interface between the AV playback engine 4 and the ENAV engine 3 that support playing back of interactive contents recorded on the DVD 300, and is defined as follows:
[object].EnableRCKeyInput(x)

1. Summary

This command serves to prohibit the user input from being transmitted to the AV playback engine 4. In the present embodiment, {object} is dvdVideo.

2. Parameter x=0: disable x=1: enable

3. Return Value

| Number | Name | Description |
|---|---|---|
| 0 | OK | Successful |
| −1 | GeneralError | Unknown error condition |

When the second event, i.e., EnableRCKeyInput (0), occurs using the second event information recorded in the markup document in script language, the user input is transmitted to the ENAV engine 3 and prohibited from being transmitted to the AV playback engine 4. For example, if an interactive content maker desires to change the display of a markup document according to a predetermined user input, he or she makes a markup document containing the second event information to generate the API command EnableRCKeyInput to prohibit the user input from being transmitted to the AV playback engine 4.

An example of a document in which the second event information is written is shown as follows:

```
<?xml version ="1.0" encoding="UTF-8"?>
<!DOCTYPE html PUBLIC "-//DVD//DTD XHTML DVD-
HTML 1.0//EN"
"http://www.dvdforum.org/envideo/dtd/dvdhtml-1-0.dtd">
<html>
<head>
<title>Prevent Default</title>
<script type="text/javascript">
function RcKeyEventHandler(evt)
{
    switch(evt.keyCode)
    {
    case 23 : evt.preventDefault( );
    case 24 : evt.preventDefault( );
    case 25 : evt.preventDefault( );
    case 26 : evt.preventDefault( );
    case 27 : evt.preventDefault( );
    }
}
</script>
<script type="text/javascript">
function setupEventHandler( )
{
// eventHandler is registered to bodyNode and Interactive Contents
bodyNode.addEventListener("rckeypress",RcKeyEventHandler,true);
}
</script>
</head>
<body id=bodyNode" onload="setupEventHandler( )"
...........................................................
</body>
</html>
```

As seen in the above markup document, the AV playback engine 4, which handles the markup document in which the second event information is written, does not perform operations corresponding to user inputs, i.e., inputs of the direction keys 52, 53, 54, and 55 in which default operations are defined.

In such a situation, the content maker may further write the third event information that defines the operation of the ENAV engine 3 responding to desired user inputs.

The third event information enables the ENAV engine 3 to receive the user input and perform a predetermined operation even though the user input is directly transmitted to the AV playback engine 4. As will be defined later with reference to FIGS. 6A and 6B, the third event information does not define any default operations except the 'OK' key 51 and the direction keys 52, 53, 54, and 55. Thus, even when any user inputs an instruction other than the 'OK' key 51 and the direction keys 52, 53, 54, and 55, the ENAV engine 3 does not operate. However, the markup document maker may record the third event information in the markup document so that the defined default operations are not performed. As a result, although the user presses the 'OK' key 51 and the direction keys 52, 53, 54, and 55, focus and highlight information are not moved.

FIGS. 6A and 6B each illustrate an example of "predetermined information concerning the operations of the AV playback engine 4 and the ENAV engine 3".

The "predetermined information on the operations of the AV playback engine 4 and the ENAV engine 3" defines the operation of the AV playback engine 4 and/or the ENAV engine 3 when the user presses keys of the remote control 400, i.e., a key input event RCKeyEvent corresponding to a user action occurs. As defined above, in a case wherein the operations of the AV playback engine 4 and the ENAV engine 3 are defined to correspond to the keys of the remote control 400, a playback device maker and a content maker are highly likely to exist separately. Even in this case, a playback device and contents made according to the "predetermined information on the operations of the AV playback engine 4 and the ENAV engine 3" are most likely to match. Also, even if a plurality of content makers exist, when contents are made using a user input handling method according to the present invention based on the "predetermined information on the operations of the AV playback engine 4 and the ENAV engine 3", the contents may match with the AV playback engine 4 and be suitable for further interactively controlling AV contents and markup contents.

As may be seen in FIGS. 6A and 6B, default operations of the ENAV engine 3 are mostly undefined. An interactive content maker may make a markup document using script language so that the ENAV engine 3 performs desired operations. A property 'keyCode' indicates predetermined key codes of keys pressed by a user and a property 'keyName' indicates names of the pressed keys. The descriptions of the operation of the AV playback engine 4 are based on "DVD-Video Specifications for Read Only Disc/Part 3. Video Specifications Version 1.0".

Notes 1), 2), 3), 4), 5), 6), 7), and 8) are explained below.

Note 1) Keys for which default operations of the ENAV engine 3 are not set may be used as connection keys capable of directly focusing specific elements by using the property 'keyCode' or 'keyName' as an 'accesskey' property value in a markup document.

Note 2) For the 'Screen' key 48, default operations of the ENAV engine 3 are not defined. However, if a markup document is made, in which script codes to support a full-screen mode in an interactive mode (embedment mode) are written, the following operations will be defined.
[object].FullScreen(x)
 1. Summary
 DVD-Video data is set to an embedded mode or a full-screen mode. In the present embodiment, [object] is dvd-Video.
 2. Parameter
 x=0: set to an embedded mode
 x=1: set to a full-screen mode
 3. Return Value

| Number | Name | Description |
|---|---|---|
| 0 | OK | Successful |
| −1 | General error | Unknown error condition |

Note 3) A focus moves to an object element of elements of a markup document embedding DVD-Video data and returns to a state for navigating DVD-Video data. In other words, highlighted information may be moved by the direction keys 52, 53, 54, and 55 shown in FIG. 2, and then a corresponding menu may be selected by the 'OK' key 51 or DVD-Video data may be navigated by DVD playback control keys. An example of a method of navigating DVD-Video data is described in detail in Korean Patent Application No. 02-37515, entitled "Focusing Method in Interactive mode, and Apparatus and Information Storage Medium Therefor", filed on Jun. 27, 2002 by the applicant of the present invention.

When DVD-Video data has already been navigated, the focus moves to the previously focused element of the markup document.

Note 4) The 'Play/Pause' key 60 complies with the following algorithm to play back DVD-Video data and pause the playback of DVD-Video data. When the operation of the AV playback engine 4, i.e., the playback of DVD-Video data, stops, a first playback program chain of DVD-Video data is played back. When DVD-Video data is being played back, a 'Pause_On( )' operation is carried out. When the playback of DVD-Video data pauses, a Pause_Off( ) operation is performed. The 'Pause_On( ) and Pause_Off( )' operations are user operation functions defined in "DVD-Video Specifications for Read Only Disc/Part 3. Video Specifications Version 1.0".

Note 5) A title is played back by moving from a current part of title (PTT) number to a previous PTT number. If a PTT number one less than the current PTT number does not exist in the title, the last PTT number of a previous part of the title is played back. The title is played back by moving a first PTT number that is the smallest title number to a last PTT number that is the largest title number. PTT numbers are described in detail in the "DVD-Video Specifications for Read Only Disc/Part 3. Video Specifications Version 1.0".

Note 6) A title is played back by moving a current PTT number to a next PTT number. If a PTT number one greater than the current PTT number does not exist in the title, a first PTT number of a next part of the title is played back. The title is played back by moving a last PTT number that is the largest title number to a first PTT number that the smallest title number.

Note 7) The change of a sub picture is performed. The sub picture is basically set so that it is not to be displayed on a screen. Thus, if a user desires to display the sub picture on the screen, the user has to change the defaults on the playback device 200 to display the sub picture. Then, a specific sub picture stream having one of sub picture stream numbers 0 through 31, set in the playback device 200, is displayed. Whenever the user presses the 'Subtitle' key 63, a sub picture stream, which has a sub picture stream number obtained by adding 1 to the specific sub picture stream number, is displayed. However, the sub picture stream always has the sub picture stream number zero after the last sub picture stream number. Changing the sub picture is described in detail in the "DVD-Video Specifications for Read Only Disc/Part 3. Video Specifications Version 1.0".

Note 8) The change of an angle of a picture is carried out. The default is set to display the picture starting from an angle number 1. Whenever the user presses the 'Angle' key 64 to change a current angle, an angle number obtained by adding 1 to the current angle number is displayed. When the user re-presses the 'Angle' key 64 when the last angle number is displayed, the last angle number is changed into the angle number 1. Changing the angle is explained in detail in the "DVD-Video Specifications for Read Only Disc/Part 3. Video Specifications Version 1.0".

Note 9) A change in audio preferences is performed. The basic default of the audio settings is set not to include or select an audio stream. After the audio stream is selected, an audio stream having an audio stream number obtained by adding 1 to a current audio stream number is displayed whenever the user presses the 'Audio' key 62. When the user re-presses the 'Audio' key 62 while a last audio stream number is being displayed, the last audio stream number is changed into the audio stream number 1. Changing the audio stream is described in detail in the "DVD-Video Specifications for Read Only Disc/Part 3. Video Specifications Version 1.0".

The operations of the keys of 'RCKeyEvent' are defined below:

```
interface RCKeyEvent : UIEvent {
  const unsigned long VK_0 = 0; // keyCode is "0", keyName is "0"
  const unsigned long VK_1 = 1; // "1"
  const unsigned long VK_2 = 2; // "2"
  const unsigned long VK_3 = 3; // "3"
  const unsigned long VK_4 = 4; // "4"
  const unsigned long VK_5 = 5; // "5"
  const unsigned long VK_6 = 6; // "6"
  const unsigned long VK_7 = 7; // "7"
  const unsigned long VK_8 = 8; // "8"
  const unsigned long VK_9 = 9; // "9"
  const unsigned long VK_A = 10; // keyCode is "10", keyName is "A"
  const unsigned long VK_B = 11; // "B"
  const unsigned long VK_PLAY_PAUSE = 12; // "PlayPause"
  const unsigned long VK_STOP = 13; // "Stop"
  const unsigned long VK_FF= 14; // "FastForward"
  const unsigned long VK_FR= 15; // "FastRewind"
  const unsigned long VK_SKIP_PREV = 16; // "Prev"
  const unsigned long VK_SKIP_NEXT = 17; // "Next"
  const unsigned long VK_SUBTITLE = 18; // "Subtitle"
  const unsigned long VK_ANGLE = 19; // "Angle"
  const unsigned long VK_AUDIO = 20; // "Audio"
  const unsigned long VK_ROOTMENU = 21; // "RootMenu"
  const unsigned long VK_TITLEMENU = 22; // "TitleMenu"
  const unsigned long VK_UP = 23; // "Up"
  const unsigned long VK_LEFT = 24; // "Left"
  const unsigned long VK_RIGHT = 25; // "Right"
  const unsigned long VK_DOWN = 26; // "Down"
  const unsigned long VK_OK = 27; // "OK"
  const unsigned long VK_RETURN = 28; // "Return"
  const unsigned long VK_EXIT = 29; // "Exit"
  const unsigned long VK_CONTENT_INFO = 30; // "Content"
  const unsigned long VK_SCREEN_MODE = 31; // "Screen"
  const unsigned long VK_FOCUS_CHANGE = 32; // "FocusChange"
  readonly attribute unsigned long keyCode;
  readonly attribute DOMString keyName;
  void initRCKeyEvent (in DOMString typeArg,
    in boolean canBubbleArg,
    in boolean cancelableArg,
    in unsigned long keyCode,
    in unsigned long keyName);
```

A method of handling user inputs in an interactive mode according to an embodiment of the present invention will be described below, based on the above-described structure.

FIG. 7 is a flowchart to illustrate operations of a method of handling a user input in an interactive mode, according to an embodiment of the present invention. Referring to FIG. 7, in operation 701, a determination is made as to whether a key input event occurs as a first event according to first event information recorded in a markup document or via a predetermined key of the remote control 400 pressed by a user. If in operation 701, it is determined that the key input event occurs, in operation 702, the AV playback engine 4 is informed of the occurrence of the key input event via the ENAV engine 3. In operation 703, a determination is made as to whether a second event occurs. If in operation 703, it is determined that the second event occurs, in operation 704, the ENAV engine 3 prohibits the AV playback engine 4 from being directly informed of the occurrence of the key input event.

Meanwhile, if in operation 703, the key input event matches with the second event information recorded in the markup document so that the second event occurs, in operation 704, the ENAV engine 3 transmits a control command corresponding to the second event to the AV playback engine 4.

Figure 8:
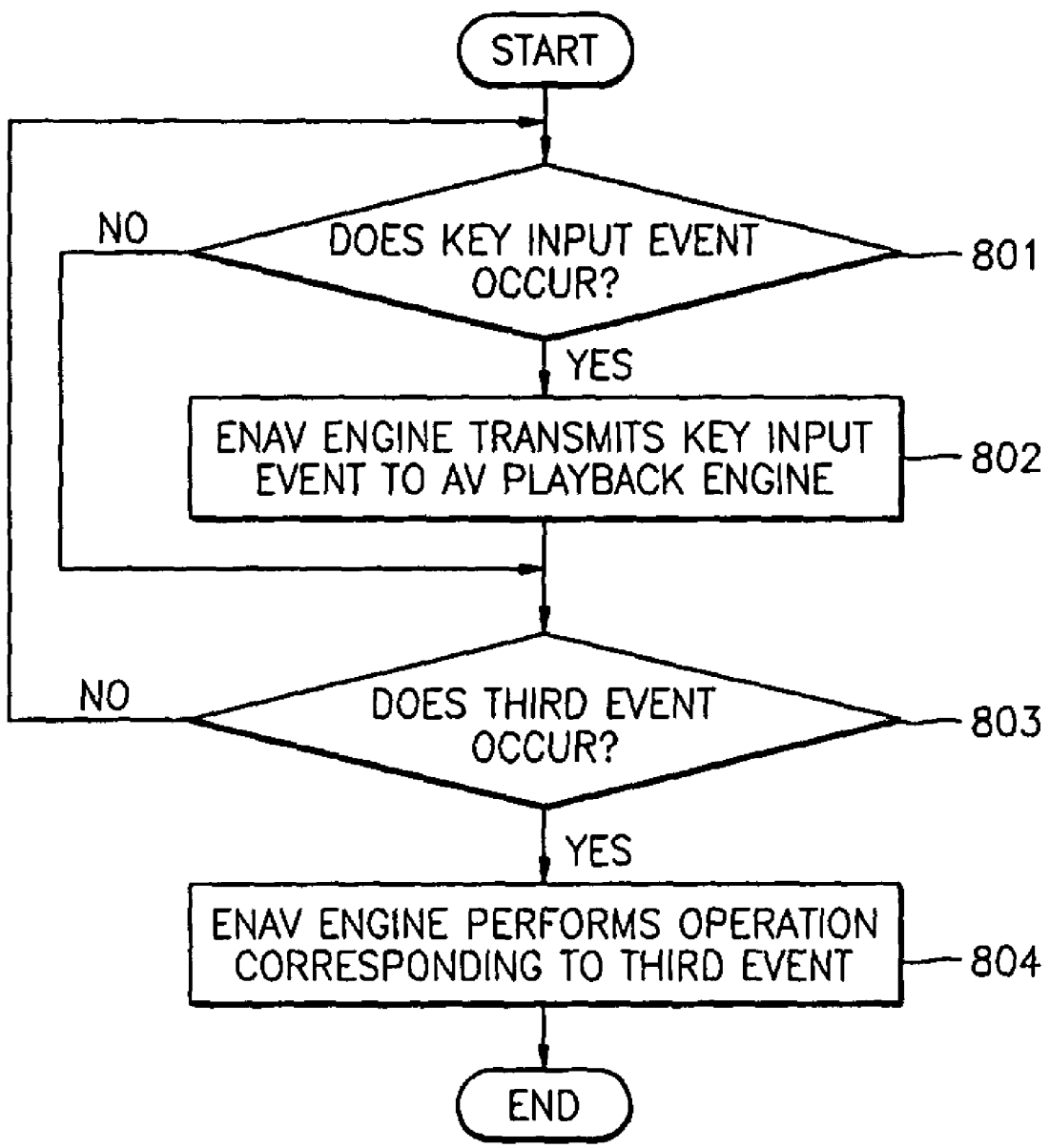
FIG. 8 is a flowchart illustrating operations of a method of handling a user input in an interactive mode, according to another embodiment of the present invention.

FIG. 8 is a flowchart to illustrate operations of a method of handling a user input in an interactive mode, according to another embodiment of the present invention. Referring to FIG. 8, in operation 801, a determination is made as to whether a key input event occurs as a first event according to first event information recorded in a markup document or via a predetermined key of the remote control 400 pressed by a user. If in operation 801, it is determined that the key input event occurs, in operation 802, the AV playback engine 4 is informed of the occurrence of the key input event via the ENAV engine 3. In operation 803, a determination is made as to whether a third event occurs. If in operation 803, it is determined that the third event occurs, in operation 804, the ENAV engine 3 performs a predetermined operation corresponding to the third event.

FIG. 9 is a flowchart to illustrate operations of a method of handling a user input in an interactive mode, according to still another embodiment of the present invention. Referring to FIG. 9, in operation 901, a user presses a predetermined key of the remote control 400. In operation 902, a key input event occurs. In operation 903, the interface handler 35 of the ENAV engine 3 handles the key input event by transmitting a playback control command corresponding to the key input event to the AV playback engine 4.

FIG. 10 is a flowchart to illustrate operations of a method of handling a user input in an interactive mode, according to yet another embodiment of the present invention. Referring to FIG. 10, in operation 1001, a user presses a predetermined key of the remote control 400. In operation 1002, a key input event occurs and the interface handler 35 of the ENAV engine 3 is informed of the occurrence of the key input event, and the interface handler 35 of the ENAV engine 3 informs the AV playback engine 4 of the occurrence of the key input event. In operation 1003, the AV playback engine 4 performs an operation corresponding to the key input event. For example, when the user presses the 'fastfoward' key 61, the AV playback engine 4 performs a 'FORWARD_SCAN(SPEED)' operation according to the "predetermined information on the operations of the ENAV engine 3 and the AV playback engine 4" illustrated in FIGS. 6A and 6B.

FIG. 11 is a flowchart to illustrate operations of a method of handling a user input in an interactive mode, according to still yet another embodiment of the present invention. Referring to FIG. 11, in operation 1101, a user clicks on a button made in a markup document. In operation 1102, an onclick event occurs. In operation 1103, the interface handler 35 of the ENAV engine 3 handles the onclick event by transmitting a playback control command corresponding to the onclick event to the AV playback engine 4.

As described above, the present invention provides a method of effectively handling interactive contents using a limited user input device in an interactive mode, and an apparatus and information storage medium therefor. Accordingly, a user input may be transmitted to an ENAV engine, and then the ENAV engine may transmit a playback control command corresponding to the user input to an AV playback engine, or the user input may be transmitted directly to the AV playback engine without passing through the ENAV engine. As a result, markup and AV contents may be interactively controlled in the interactive mode.

In other words, conventional modes and definitions for user inputs used by a markup document viewer to interpret and display a markup document, e.g., a browser, may be employed in the present invention. Also, user inputs may be effectively handled in the interactive mode. Therefore, a user may conveniently navigate an interactive picture (a markup picture and an AV picture) or control an object (contained in the markup document) displayed in the interactive picture without confusing a key input.

The above-described method of handling a user input in an interactive mode may be written as a computer program. Codes and code segments of the computer program may be easily analogized by a computer program. Also, the computer program is stored in a computer-readable medium and is read and executed by a computer so that the method of handling a user input in an interactive is realized. Computer-readable media may include magnetic recording media and optical recording media.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory computer readable information storage medium comprising:
 AV data; and
 a markup document configured to be utilized to reproduce the AV data in an interactive mode comprising a full mode and an embedded mode,
 wherein the markup document comprises first event information that, when read by an ENAV engine, causes the ENAV engine to inform, by default, an AV playback engine, which plays back the AV data, of an occurrence of a key input event corresponding to a user action, and second event information that, when read by the ENAV engine, causes the ENAV engine to prohibit informing the AV playback engine, which decodes the AV data, of the occurrence of the key input event,
 wherein the first event information comprises event registration information to check whether the user performed the action and event handling information to handle the event by controlling an operation of the AV playback engine when the key input event occurs, and
 wherein the first event information and the second event information are read by the ENAV engine when the AV data is reproduced in the interactive mode comprising the full mode and the embedded mode.

2. The non-transitory computer readable information storage medium of claim 1, wherein:
 the event registration information is recorded using an on-click event defined in the markup document; and
 the event handling information is created by a function that allows the AV playback engine to perform an operation corresponding to the on-click event.

3. The non-transitory computer readable information storage medium of claim 1, wherein:
 the event registration information is recorded using a key input event listener to check whether the key input event occurs; and
 the event handling information is recorded using a key input event handler to control the operation of the AV playback engine.

4. The non-transitory computer readable information storage medium of claim 1, wherein the AV playback engine is informed of the occurrence of the key input event via the ENAV engine that interprets and executes the markup document.

5. The non-transitory computer readable information storage medium of claim 1, wherein the AV playback engine is informed of the occurrence of the key input event via an interface handler in the ENAV engine that interprets and executes the markup document.

6. The non-transitory computer readable information storage medium of claim 5, wherein the interface handler transmits a playback control command to implement a predetermined operation of the AV playback engine corresponding to the key input event.

7. The non-transitory computer readable information storage medium of claim 1, wherein the first event information is written using at least one of script language and markup language.

8. The non-transitory computer readable information storage medium of claim 7, wherein the first event information is written using at least one of JavaScript language and XML language.

9. The non-transitory computer readable information storage medium of claim 1, wherein the second event information is recorded using an Application Program Interface (API).

10. A non-transitory computer readable information storage medium comprising:
    AV data; and
    a markup document configured to be utilized to reproduce the AV data in an interactive mode comprising a full mode and an embedded mode,
    wherein the markup document comprises first event information that, when read by an ENAV engine, causes the ENAV engine to inform, by default, an AV playback engine, which plays back the AV data, of an occurrence of a key input event corresponding to a user action, while operating in the interactive mode, and second event information that, when read by the ENAV engine, causes the ENAV engine to prohibit informing the AV playback engine, which decodes the AV data, of the occurrence of the key input event,
    wherein the first event information comprises event registration information to check whether the user performed the action and event handling information to handle the event by controlling an operation of the AV playback engine when the key input event occurs, and
    wherein the first event information and the second event information are read by the ENAV engine when the AV data is reproduced in the interactive mode comprising the full mode and the embedded mode.

11. A method of handling a user input in an interactive mode comprising a full mode and an embedded mode, in which played back AV data is displayed with a markup document, the method comprising:
    when a key input event corresponding to a user action occurs:
        informing an ENAV engine, which interprets and executes the markup document, of the occurrence of the key input event;
        informing, by default, by the ENAV engine, an AV playback engine, which plays back the AV data, of the occurrence of the key input event; and
        prohibiting, when a second event occurs using second event information recorded in the markup document, the AV playback engine from being informed of the occurrence of the key input event,
    wherein the informing of the ENAV engine of the occurrence of the key input event comprises creating the key input event using first event information recorded in the markup document, the informing of the AV playback engine of the occurrence of the key input event comprises transmitting a playback control command corresponding to the key input event to the AV playback engine to handle the key input event, and the markup document includes event registration information to check whether the user performed the user action, and
    wherein the first event information and the second event information are read by the ENAV engine when the AV data is reproduced in the interactive mode comprising the full mode and the embedded mode.

12. The method of claim 11, wherein:
    the informing of the ENAV engine of the occurrence of the key input event comprises creating the key input event using an onclick event that occurs by clicking on a button made in the markup document, the onclick event being the first event information recorded in the markup document; and
    the informing of the AV playback engine of the key input event comprises transmitting a playback control command corresponding to the onclick event to the AV playback engine to handle the onclick event.

13. The method of claim 11, wherein the prohibiting comprises creating the second event according to the second event information which is recorded using an Application Program Interface (API).

14. The method of claim 11, further comprising controlling the markup picture in correspondence with a third event which occurs according to a third event information recorded in the markup document.

15. An apparatus to reproduce AV data in an interactive mode comprising a full mode and an embedded mode, the apparatus comprising:
    an AV playback engine configured to play back the AV data; and
    an ENAV engine that interprets and executes a markup document,
    wherein, when a key input event corresponding to a user action occurs, the ENAV engine informs, by default, the AV playback engine of the occurrence of the key input event, and allows the key input event to occur using first event information written in the markup document, which includes event registration information to check whether the user performed the action,
    wherein, when a second event occurs, the ENAV engine refrains from informing the AV playback engine of the occurrence of the key input event based on second event information recorded in the markup document, and
    wherein the first event information and the second event information are read by the ENAV engine when the AV data is reproduced in the interactive mode comprising the full mode and the embedded mode.

16. The apparatus of claim 15, wherein the ENAV engine generates an API command to control the AV playback engine, in response to the key input event corresponding to the user action.

17. The apparatus of claim 15, wherein, when the key input event occurs using the first event information, the ENAV engine transmits a playback control command corresponding to the key input event to the AV playback engine to handle the key input event.

18. The apparatus of claim 15, wherein when an onclick event occurs using the first event information, the ENAV engine transmits a playback control command corresponding to the onclick event to the AV playback engine to handle the onclick event.

19. The apparatus of claim 15, wherein the ENAV engine comprises an interface handler that informs the AV playback engine of the occurrence of the key input event.

* * * * *